United States Patent [19]
Iritani

[11] Patent Number: 5,701,753
[45] Date of Patent: Dec. 30, 1997

[54] AIR CONDITIONING APPARATUS

[75] Inventor: Kunio Iritani, Anjo, Japan

[73] Assignee: Nippondenso Co., Ltd., Kariya, Japan

[21] Appl. No.: 673,157

[22] Filed: Jun. 25, 1996

[30] Foreign Application Priority Data

| Jun. 26, 1995 | [JP] | Japan | 7-159593 |
| Jun. 27, 1995 | [JP] | Japan | 7-160557 |

[51] Int. Cl.6 .............................. F25B 41/00; F25B 41/04
[52] U.S. Cl. .................................................. 62/211; 62/222
[58] Field of Search .................................... 62/210, 211, 222

[56] References Cited

U.S. PATENT DOCUMENTS

| 5,115,644 | 5/1992 | Alsenz | 62/211 X |
| 5,157,931 | 10/1992 | Alsenz | 62/211 X |
| 5,174,123 | 12/1992 | Erickson | 62/222 X |

*Primary Examiner*—William E. Wayner
*Attorney, Agent, or Firm*—Harness, Dickey & Pierce, PLC

[57] ABSTRACT

In the heating operation mode, the condensed temperature is calculated by the value of the discharged pressure sensor disposed at the discharge side of the compressor. Based on a difference between the condense temperature and a value of the outlet temperature sensor for detecting the refrigerant having passed through the heating indoor heat exchanger, the supercooling degree is calculated. Then, an opening degree of the expansion valve for heating is controlled so that the calculated supercooling degree is set to a target supercooling degree. Thus, since the condensed temperature is calculated by employing a high responsive pressure sensor, an error in the calculation of the condensed temperature can be reduced, thereby reducing an error in the calculation of the supercooling degree.

21 Claims, 11 Drawing Sheets

AIR CONDITIONING APPARATUS

CROSS-REFERENCE TO RELATED APPLICATIONS

This application is related to and claims priority from Japanese Patent Application Nos. Hei. 7-159593 filed on Jun. 26, 1995 and Hei. 7-160557 filed on Jun. 27, 1995, the contents of which are hereby incorporated by reference.

BACKGROUND OF THE INVENTION

1. Field of the Invention

The present invention relates to an air conditioning apparatus and a refrigeration cycle control unit for controlling a supercooling degree of liquid refrigerant in the condenser to a predetermined target supercooling degree, by controlling an electric type pressure reducing device of a refrigerant cycle composed of a compressor, a condenser, an electric type pressure reducing device and an evaporator. Furthermore, the present invention relates to a supercooling degree calculating device calculating the aforementioned supercooling degree.

2. Description of Related Art

In an air conditioner disclosed in JP-A-3-170753, a first temperature sensor on a refrigerant pipe at the center of a heat exchanger functioning as a condenser of a refrigerant cycle in order for detecting the temperature of the saturated liquid refrigerant of dryness zero (0), and a second temperature sensor on a refrigerant pipe of the outlet of the condenser are respectively disposed, a supercooling degree of condensed liquid refrigerant in the condenser is calculated from a detected temperature difference of these respective temperature sensors, and an opening degree of an electronic expansion valve is controlled such that the calculated supercooling degree is set to a predetermined value within a certain range.

By the way, a temperature sensor is generally inferior in its responsibility. Accordingly, as described above, in case that the first temperature sensor detects the temperature of the saturated liquid refrigerant of dryness zero (0), especially when a changing rate of the supercooling degree is large, such as immediately after starting the air conditioner, an error in the detection of the condensed temperature becomes large. Therefore, an error in the calculation of the supercooling degree becomes large, as a result, the control performance of the opening degree of the electronic expansion valve is deteriorated, thus making it impossible to control the supercooling degree accurately.

As a result of studying the above problem, the inventor found out that, if the saturated liquid refrigerant temperature of dryness zero (0) is calculated by using higher responsive pressure sensor than a temperature sensor, the error in the calculation can be small. Therefore, by calculating the supercooling degree based on the saturated liquid refrigerant temperature of dryness zero (0), which has smaller error in the calculation and the outlet refrigerant temperature of the condenser, the error in the calculation of the supercooling degree can be small. The inventor repeatedly examined this matter.

Consequently, the inventor conceived that the saturated liquid refrigerant temperature of dryness zero (0) can be calculated without using a separate sensor specifically, if the discharged pressure sensor disposed at the discharge side of the compressor for protecting from high pressure detects the pressure of discharged refrigerant at the discharge side and calculates the saturated liquid refrigerant temperature of dryness zero (0) from the discharge pressure.

In such a case, however, since there is a pressure loss of the refrigerant from the position where the discharge pressure sensor is disposed to the outlet of the condenser, there is another problem that this pressure loss itself is regarded as an error in the calculation of the saturated liquid refrigerant temperature of the above-described dryness zero (0).

Further, another problem has been found that the outlet refrigerant temperature detected by the outlet refrigerant temperature sensor and the actual refrigerant temperature have a difference due to the ambient temperature of the outlet temperature sensor detecting the outlet refrigerant temperature of the condenser, i.e., in case, for example, the circumference of the outlet temperature sensor is exposed to the outside air, the lower the outside air temperature is, the lower the detected value of the outlet temperature sensor becomes than the actual temperature.

SUMMARY OF THE INVENTION

In light of the above-described problem, an object of the present invention is to reduce an error in the calculation of the supercooling degree calculated from the condensed temperature and the condenser outlet refrigerant temperature small, by reducing an error obtaining the condensed temperature.

Further, another object of the present invention is to calculate the saturated liquid refrigerant temperature of dryness zero (0) with high responsiveness and as accurate as possible in calculating the saturated liquid refrigerant temperature of dryness zero (0) based on a value of the discharge pressure detecting means disposed at the discharge side of the compressor by compensating for this calculated saturated liquid refrigerant temperature corresponding to the portion of the pressure loss of the refrigerant from the position where the discharge pressure detecting means is disposed to the outlet of the condenser.

Further, another object of the present invention is to reduce an error in the detection of the outlet refrigerant temperature and an error in the calculation of the supercooling degree by compensating for the detected value of the detecting means corresponding to the ambient temperature of the means detecting the outlet refrigerant temperature of the condenser.

According to the present invention, when the compressor is operated to compress the refrigerant, the compressed refrigerant condenses in the condenser. Further, after supercooled, its pressure is reduced by the electric type pressure reducing device. This refrigerant, of which pressure has been reduced, evaporates at the evaporator, then, it returns to the compressor again.

At this time, the control unit controls the electric type pressure reducing device so that the degree of supercooling (supercooling degree) can be set to a predetermined supercooling degree.

When air current generates in the air passage after the blower is operated, the air sucked from the inside air inlet or the outside air inlet is blown out toward the compartment from the outlets after being heated by the condenser or cooled by the evaporator.

Here, the control unit calculates condensed temperature from high pressure of the refrigerant cycle to calculate the supercooling degree based on this condensed temperature and the outlet refrigerant temperature of the condenser in order to control the electric type pressure reducing device, so that the calculated supercooling degree is set to a predetermined target supercooling degree.

Thus, according to the present invention, an error in obtaining the condensed temperature is reduced as compared with a case where a condensed temperature is obtained by using a temperature detecting means, because pressure detecting means having a higher responsibility than the temperature detecting means is used to calculate the condensed temperature. As a result, an error in calculation of the supercooling degree based on the condensed temperature and the outlet refrigerant temperature can be reduced, thereby improving control performance of the electric type pressure reducing device and making it possible to perform an appropriate supercooling degree control.

According to the first preferred mode of the present invention., outside air temperature detecting means for detecting the outside air temperature and the target supercooling degree calculating means for calculating the target supercooling degree as a larger value in accordance with the decrease of the outside air temperature detected by the outside air temperature detecting means are further included.

As second preferred mode, suction temperature detecting means for detecting suction air temperature of the condenser in the air passage and target supercooling degree calculating means for calculating the target supercooling degree as a larger value in accordance with the decrease of the outside air temperature detected by said suction temperature detecting means are further included.

As further third preferred mode, air amount detecting means for detecting air amount passing through the condenser and target supercooling degree calculating means for calculating the target supercooling degree as a larger value in accordance with the increase of the air amount detected by the air amount detecting means are further included.

According to these preferred modes, while the radiated capacity in the condenser in the heating operation mode is optimized, the efficiency of the refrigerant cycle is maximized, thereby saving consumed power of the compressor as much as possible.

When the outside air temperature is low, to prevent the window from being defrosted, the outside air introducing mode where the inside air inlet is closed and the outside air inlet which is opened is set. In such a case, according to the first preferred mode, the lower the outside air temperature is, the temperature of the air passing through the condenser becomes low. In other words, because the temperature difference between the temperature of the refrigerant flowing in the condenser and the temperature of the air passing through the condenser becomes large, the aforementioned radiated capacity becomes large.

In such a case, by calculating a target supercooling degree as a larger value, even if the consumed power of the compressor becomes consequently large, the radiated capacity becomes larger than that and the efficiency of the refrigerant cycle is improved. Accordingly, the lower the outside air temperature is, the efficiency of the refrigerant cycle can be maximized while optimizing the radiated capacity optimum by calculating the target supercooling degree as a larger value.

In the second preferred mode similar to the above, the lower the suction temperature is, that is, the lower the air temperature passing through the condenser is, the efficiency of the refrigerant cycle can be maximized while optimizing the radiated capacity optimum by calculating the target supercooling degree as a larger value.

In the third preferred mode, the larger the air amount passing through the condenser is, the lower the high pressure becomes. Thus, when the air amount is large, as the target supercooling degree is calculated as a larger value to raise the radiated capacity even if the consumed power becomes large, so that the efficiency of the refrigerant cycle is consequently improved, because the increase of the consumed power can be suppressed within a small value. Thus, the larger the air amount of the condenser is, the efficiency of the refrigerant cycle can be maximized while optimizing the radiated capacity optimum by calculating the target supercooling degree as a larger value.

When an opening degree of the electric type pressure reducing device is set larger than the normal opening degree for a predetermined period after starting the air conditioner, the high pressure does not abnormally rises at the time of starting the air conditioner and does not deteriorate the efficiency of the refrigerant cycle, but the refrigerant circulation amount can be ensured in addition to the improvement of start-up of the refrigeration cycle, and the supercooling degree can be closer to a target supercooling degree quickly.

Furthermore, when the present invention is applied to the air conditioner for a vehicle, even if there are restrictions on construction and limitations for installation, the condensed temperature is calculated based on a value of the high pressure detecting means, provided originally for high pressure protection and blow air temperature control, so that the high pressure detecting means for calculating the condensed temperature can be easily installed in the vehicle and means only for obtaining the condensed temperature is not needed.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1:
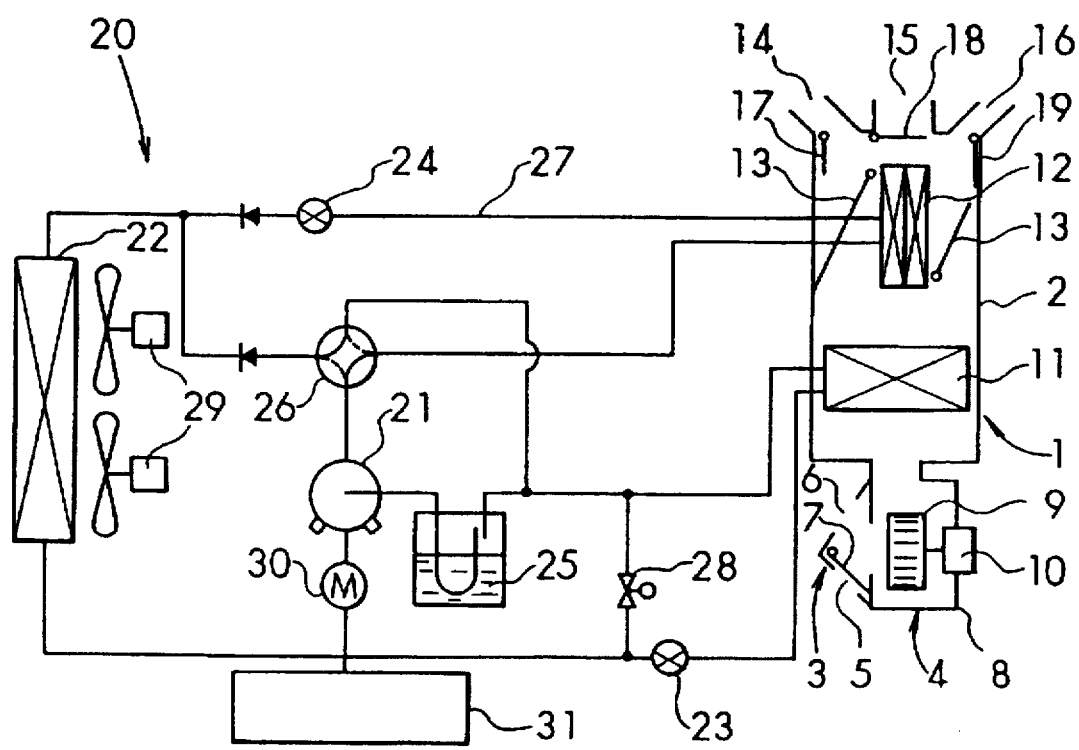
FIG. 1 is a view showing an entire structural of a first embodiment according to the present invention.

A first embodiment in which the present invention is applied to an automotive air conditioner is described with respect to FIGS. 1–12.

An air conditioner duct 2 in an air conditioner unit 1 includes an air passage for introducing the air into a passenger compartment, where an inside/outside air switching means 3 and a blower means 4 are disposed at one end and plural air outlets 14–16 communicating with the passenger compartment are formed at the other end.

The inside/outside air switching means 3 includes an inside/outside air switching box, where an inside air inlet 5 for sucking the air (inside air) into the passenger compartment, an outside air inlet 6 for sucking the air (outside air) outside into the passenger compartment are formed. In the inside/outside air switching box, an inside air switching damper 7 is disposed to selectively open or close the respective inlets 5 or 6, and the inside/outside air switching damper 7 is driven by its driving means (not shown, for example, a servomotor).

The above blower means 4 generates an air flow in the air conditioner duct 2 from the inside air inlet 5 or the outside air inlet 6 toward the respective air outlets 14–16. Specifically, a multi-vane fan 9 is disposed in a scroll casing 8, and the fan 9 is driven by a blower motor 10 as its driving means.

In addition, a cooling indoor heat exchanger 11 is disposed in the air conditioner duct 2 at an air downstream side of the fan 9. The cooling indoor heat exchanger 11 forms a part of a refrigerant cycle 20 and functions as an evaporator dehumidifying and cooling the air in the air conditioner duct 2 by a heat absorbing action of the refrigerant flowing through therein in a cooling operation mode (described below). In the heating operation mode (described below), the refrigerant does not flow through the cooling indoor heat exchanger 11.

Furthermore, a heating indoor heat exchanger 12 is disposed in the air conditioner duct 2 at an air downstream side of the cooling indoor exchanger 11. The heating indoor heat exchanger 12 forms a part of a refrigerant cycle 20 and functions as a condenser heating the air in the air conditioner duct 2 in the heating operation mode described below, by a heat radiating action of the refrigerant flowing through therein. In the cooling operation mode (described below), the refrigerant does not flow through the heating indoor heat exchanger 12.

Still further, in the air conditioner duct 2, an air mixing damper 13 disposed at a position adjacent to the heating indoor heat exchanger 12 regulates an amount of the air supplied from the fan 9 to the heating indoor heat exchanger 12 and the bypass amount of the air supplied from the fan 9 and further flowing so as to bypass the heating indoor heat exchanger 12.

As for the respective air outlets 14–16 as described above, there are specifically a defroster air outlet 14 blowing out the air conditioned air toward the inside of the windshield glass of a vehicle, a face air outlet blowing the conditioned air toward the upper half of the body of a passenger in the passenger compartment, and a foot air outlet 16 blowing the conditioned air toward the lower half of the body of the passenger in the passenger compartment. At the air upstream side of these air outlets, dampers 17–19 are disposed to open/close these outlets 14–16.

The above refrigerant cycle 20 is a heat pump type refrigerant cycle for cooling and heating the passenger compartment by the cooling indoor heat exchanger 11 and the heating indoor heat exchanger 12, and includes a refrigerant compressor 21, an outdoor heat exchanger 22, an expansion valve 23 for cooling, an expansion valve 24 for heating, an accumulator 25, a four-way valve 26 for switching the flow of the refrigerant in addition to these heat exchangers 11 and 12, all of which are connected with a refrigerant pipe 27. In FIG. 1, an electromagnetic valve 28 is disposed to control the flow of the refrigerant, and an outdoor fan 29 is disposed to blow air toward the outdoor heat exchanger 22.

The above outdoor heat exchanger 22 is a heat exchanger functioning as a condenser in the cooling operation mode (described below).

The refrigerant compressor 21 sucks, compresses, and discharges the refrigerant when being driven by an electric motor 30. The electric motor 30 is disposed in a sealed case integrally with the refrigerant compressor 21 and its rotational speed continuously varies by the control of an inverter 31. The inverter 31 is supplied with electricity and controlled by a control unit 40 (FIG. 3).

Figure 2:
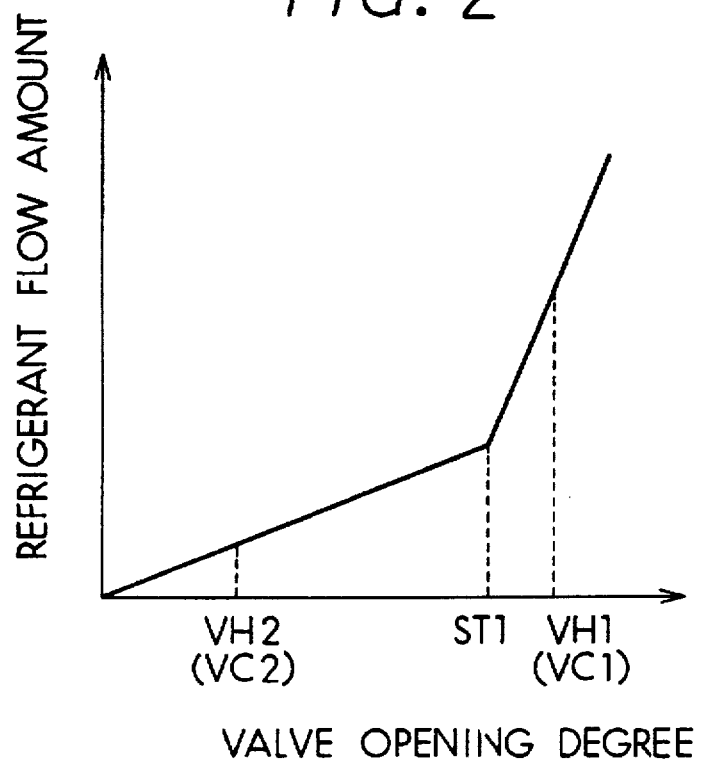
FIG. 2 is a characteristic chart showing the relationship between the opening degree of an expansion valve and a refrigerant amount of the first embodiment.
Figure 3:
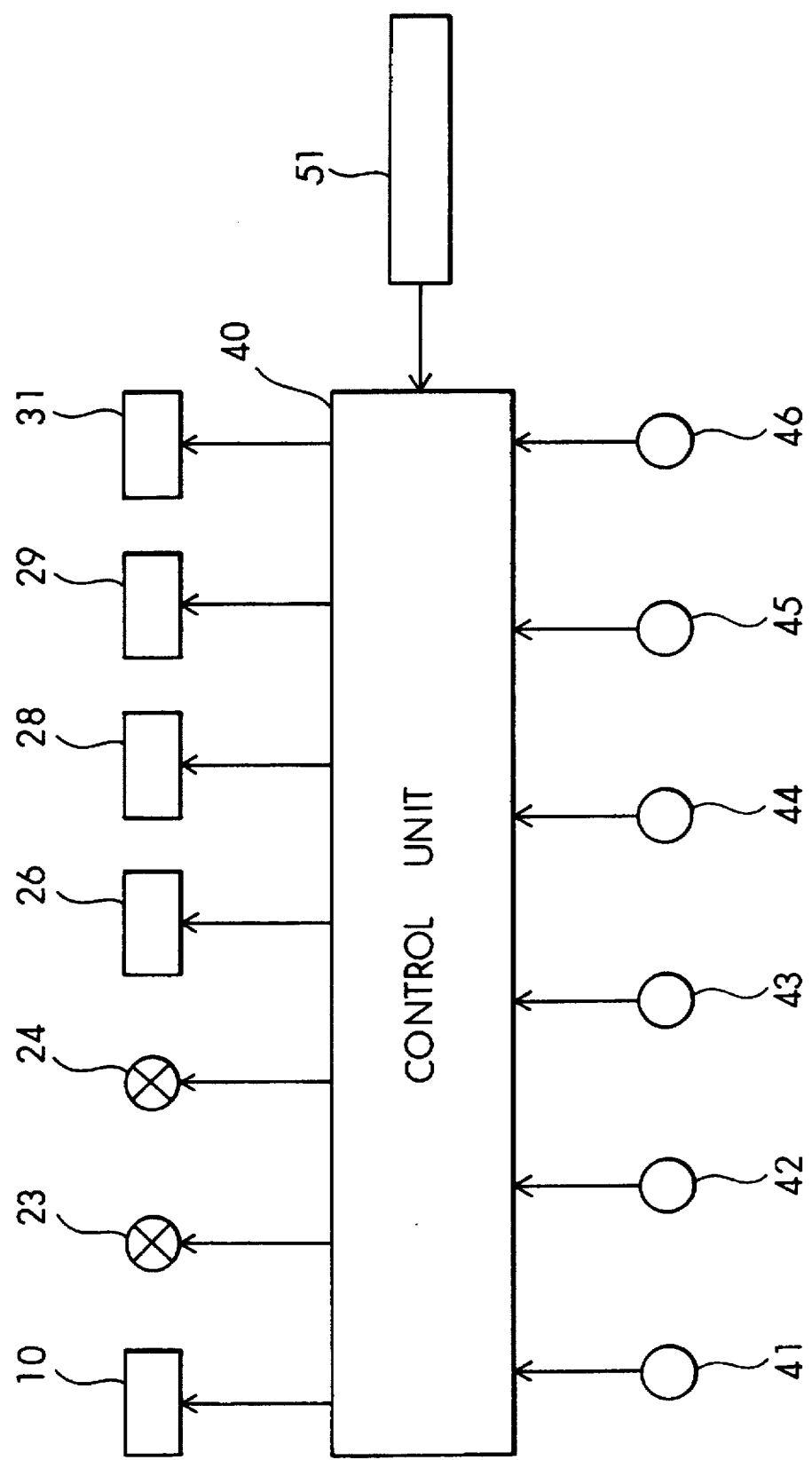
FIG. 3 is a block chart of a control system of the first embodiment.

Moreover, both of the expansion valve 23 for cooling and the expansion valve 24 for heating are electric type expansion valves, which changes the valve opening degrees by the control of the electric supply with the control unit 40 (FIG. 3). The relationship of a flowing amount of the refrigerant with respect to the valve opening degree of these expansion valves 23 and 24 is shown in FIG. 2, as for increasing amount of the flowing amount of the refrigerant with respect to the increasing amount of the valve opening degree, it increases with a predetermined inclination from VH2 to ST1 in the control valve 24 for heating, however, it increases with a larger inclination than the inclination from the valve opening degree ST1 to VH1. As for the control valve 23 for cooling, it increases with a predetermined inclination from VC2 to ST1, however, it increases with a larger inclination than the inclination from the valve opening degree ST1 to VC1.

The above upper limit value VH1 is determined according to the maximum load in the passenger compartment at the time of heating, whereas the lower limit value VH2 is determined according to the minimum load in the passenger compartment at the time of heating. Furthermore, the upper limit value VC1 described above is determined according to the maximum load in the passenger compartment at the time of cooling, whereas the lower limit value VC2 is determined according to the minimum load in the passenger compartment at the time of cooling.

As shown in FIG. 3, an outside air temperature sensor 41, a suction temperature sensor 42 detecting air temperature of the suction side (more specifically a suction side of the cooling indoor heat exchanger 11) of the heating indoor heat exchanger 12, a discharge pressure sensor 43 detecting refrigerant pressure discharged by the compressor 21, and an outdoor heat exchanger outlet temperature sensor 44 detecting refrigerant temperature after passing through the outdoor heat exchanger 22 are input into the control unit 40.

Furthermore, respective signals from an indoor heat exchanger outlet temperature sensor 45 for detecting refrigerant temperature after passing through the heating indoor heat exchanger 12 and a post-evaporator sensor 46 for detecting a cooling degree of the air (more specifically the air temperature immediately after passing the heat exchanger 11) in the cooling indoor heat exchanger 11 are input into the control unit 40, in addition, signals from respective levers and switches of a control panel 51 disposed at the front surface in the passenger compartment are also input.

The discharge pressure sensor 43 is disposed on a discharging pipe between the compressor 21 and the four way valve 26. Closely fixed with a cramp or the like to the surface of the outlet pipe of the outdoor heat exchanger 22, the outdoor heat exchanger outlet temperature sensor 44 is covered with a heat insulating material or the like in order to reduce an error in the detection of the refrigerant temperature. Similarly, closely fixed with a cramp or the like to the surface of the outlet pipe of the heating indoor heat exchanger 12, the indoor heat exchanger outlet temperature sensor 45 is covered with a heat insulating material or the like in order to reduce an error in the detection of refrigerant temperature.

Figure 4:
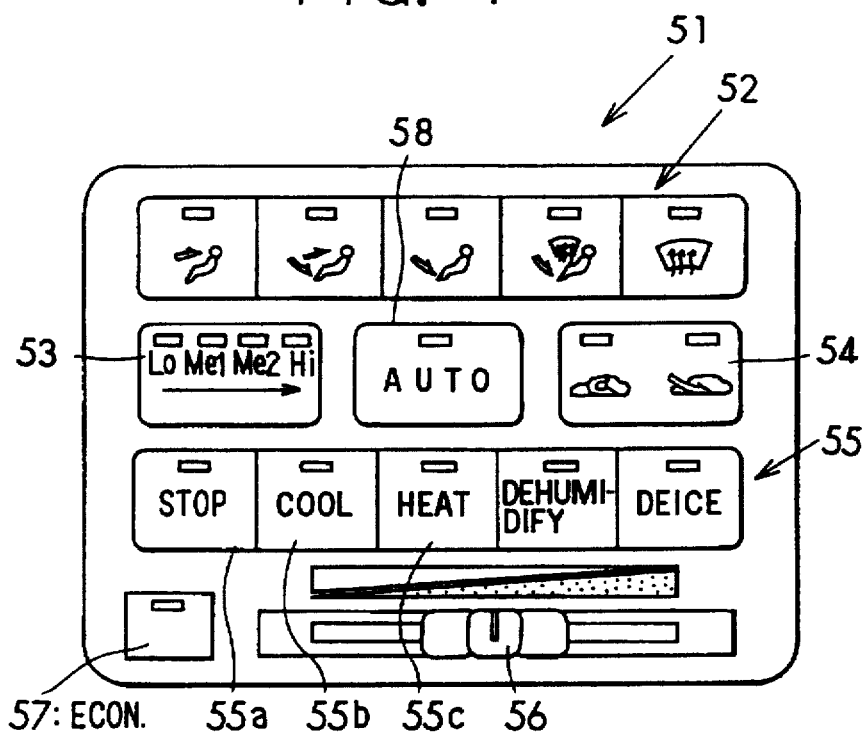
FIG. 4 is a front view of a control panel of the first embodiment.

The control panel 51, as shown in FIG. 4, is equipped with an outlet mode setting switch 52 for setting respective air outlet modes, an air amount setting switch 53 for setting air amount blown into the passenger compartment, an inside/outside air switching switch 54 setting an inside/outside air switching mode, an operation mode setting switch 55 for setting an operation mode of the refrigerant cycle 20, a temperature setting lever 56 for setting the temperature of the air blown into the passenger compartment, an electric saving switch 57 for setting a saving mode of electric consumption of the electric motor 30, and an automatic switch 58 controlling the inside/outside switching mode, the air amount, the operation mode, the outlet temperature and the air outlet modes.

The operation mode setting switch 55 includes a stop switch 55a for stopping the operation of the compressor 21, a cooler switch 55b for setting the operation mode of the refrigerant cycle 20 to the cooling operation mode, and a heater switch 55c for setting the operation mode of the refrigerant cycle 20 to the heating operation mode, or the like.

The temperature setting lever 56 is used when a passenger in the vehicle sets a target outlet temperature of the passenger compartment at a manual operation, and the control unit 40, in accordance with the set position of the lever 56, determines a target value of an air cooling degree (specifically the air temperature immediately after passing through the heat exchanger 11) in the heating indoor heat exchanger 11 in the cooling operation mode. In the heating operation mode, the control unit 40 determines a target value of an air heating degree (discharge refrigerant pressure of the compressor 21) in the heating indoor heat exchanger 12.

Moreover, the control unit 40, in the cooling operation mode, determines a target rotational speed of the compressor 21 so that the detected value of the discharge pressure sensor 43 is set to the above target value, and controls the inverter 31 according to the target rotational speed. On the other hand, in the heating operation mode, the control unit 40 determines the target rotational speed of the compressor 21 so that the detected value of the discharge pressure sensor 43 is set to the above target value, and controls the inverter 31 according to the target rotational speed. The target rotational speed Nc of the compressor 21 is stored in a predetermined area of the RAM.

A widely-known microcomputer including CPU, ROM, RAM, or the like (not shown) is incorporated in the control unit 40 so that respective signals from the respective sensors 41–46 and the control panel 51 are input to the above-described microcomputer via an input circuit (not shown) in the ECU.

Performing a predetermined process (described below) and based on the results of the process, this microcomputer controls the blower motor 10, the expansion valve 23 for cooling, the expansion valve 24 for heating, an electromagnetic valve 28, the outside fan 29, the inverter 31. Furthermore, when the key switch of a vehicle (not shown) is turned on, electric power is supplied from a battery (not shown) to the control unit 40.

When a passenger of the vehicle turns on the cooler switch 55b, the microcomputer operates the compressor 21 and controls the four way valve 26 and the electromagnetic valve 28, so that the refrigerant cycle 20 is set to the cooling operation mode. In this mode, the refrigerant flows through the compressor 21, the outdoor heat exchanger 22, the expansion valve 23 for cooling, the cooling indoor heat exchanger 11, the accumulator 25, and the compressor 21 in this order.

On the other hand, when the passenger of the vehicle turns on the heater switch 55c, the microcomputer operates the compressor 21 and controls the four way valve 26 and the electromagnetic valve 28, so that the refrigerant cycle 20 is set to the heating operation mode. In this mode, the refrigerant flows through the compressor 21, the heating indoor heat exchanger 12, the expansion valve 24 for heating, the outdoor heat exchanger 22, the electromagnetic valve 28, the accumulator 25, and the compressor 21.

Hereinafter, control process of the expansion valves 23 and 24 performed by the microcomputer is described with reference to FIGS. 5–8.

Firstly, when the electric power is supplied to the control unit 40 by turning on the key switch, the routines of FIGS. 5–8 start, at the first step 110, an initializing step for resetting all flag "f", timers T1 and T2 or the like, which will be used in the subsequent process, is performed. Then, at the step 120, signals from the respective sensors 41–46 and the respective levers and switches of the control panel 51 are read in.

Next, the step 130, based on a signal from the operation mode setting switch 55, it is determined whether the operation mode of the refrigerant cycle 20 has changed or not. When the determination is YES (there is a change), the flag "f" is reset at the step 140, however, in case of NO (there is no change), it proceeds to the step 150, and it is determined whether or not the operation mode is set to the heating operation mode by checking whether the heater switch 55c is on or not.

When the determination is YES at the step 150, the opening degree of the expansion valve 23 for cooling (hereinafter referred to EVC) becomes zero at the next step 160, that is, the expansion valve 23 is fully closed. Then, by determining whether or not the flag "f" is set at the step 170, it is determined whether or the steps 180–200 described below have been already performed or not.

In this case, when the flag "f" is set, that is, when the steps 180–200 have been already performed, it directly jumps to the step 220, however, when it is determined the steps have not been performed yet, at the steps 180–200, the opening degree of the expansion valve 24 for heating (hereinafter, referred to EVH) is maintained at the previously set upper limit value VH1 by a certain time $\tau_1$ set in advance. By the way, the above-specified time $\tau_1$ is set as a period of the compressor 21 to decrease to a certain extent, of which load is already large enough at the initial time of starting the air conditioner.

Practically, firstly, the above EVH is set to the above-mentioned upper limit value VH1 at the step 180. Then, at the next step 190, it counts up the timer T1, and at the next step 200, it is determined whether or not the timer T1 exceeds the aforementioned time $\tau_1$. When it does not exceed the time $\tau_1$, it returns to the step 290 again, however, when it exceeds the time $\tau_1$, it moves to the step 220 after the flag "f" is set at the step 210.

At the step 220, a supercooling degree (hereinafter, referred to SC) of the condensed liquid refrigerant in the heating indoor heat exchanger 12 is described, based on the following equation (1).

$$SC = T(Pd) - T_s \qquad (1)$$

wherein, T (Pd) represents condensed temperature calculated by the detected value of the discharge pressure sensor 43, and $T_{cs}$ represents a detected value of the interior heat exchanger outlet temperature sensor 45.

In other words, discharge refrigerant pressure detected by the discharge pressure sensor 43 is pressure at a point "A" in the Mollier chart (FIG. 7) of the refrigerant cycle 20. Namely, it is substantially the same as the pressure at a point "B". Thus, since the pressure at the point "B" is detected by the detected value of the discharge pressure sensor 43, the present embodiment, based on a map showing the relationship (not shown) between the condensed refrigerant pressure and the condensed temperature, which is stored in the ROM, obtains the condensed temperature at the point "B". This is the above-described T (Pd).

Figure 7:
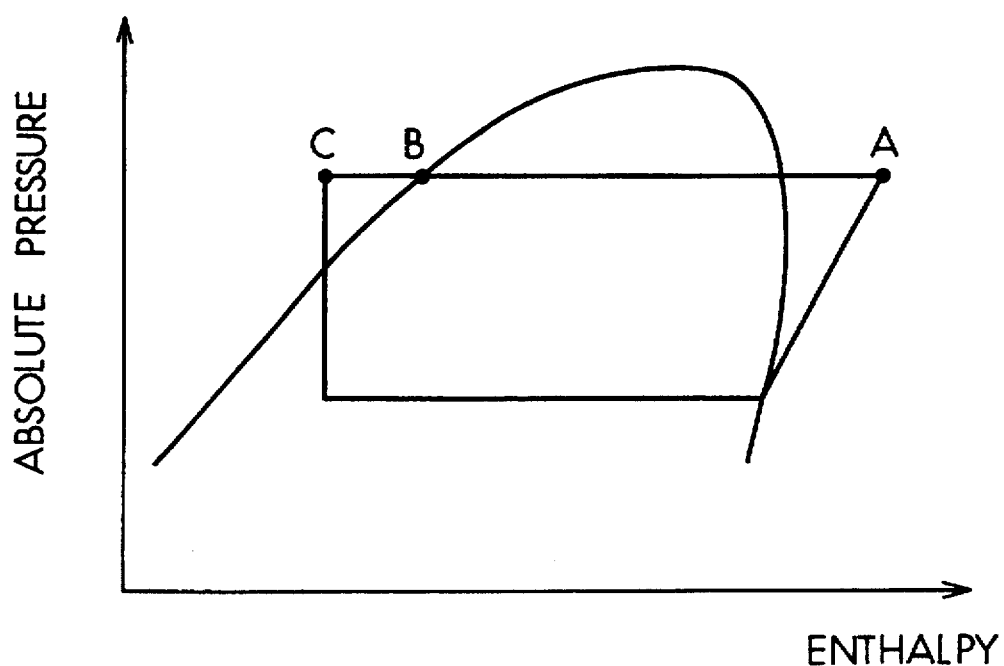
FIG. 7 is a Mollier chart of a refrigerant cycle of the first embodiment.

Furthermore, the refrigerant temperature detected by the indoor heat exchanger outlet temperature sensor 45 is the refrigerant temperature at a point "C" in FIG. 7. Accordingly in this embodiment, by performing the calculation with the above equation (1), the difference between the refrigerant temperature at the point "B" and the refrigerant temperature at the point "C" in FIG. 7, i.e., SC, is calculated.

At the step 230, a target temperature of the supercooling degree (hereinafter referred to SCO) is calculated so that the efficiency of the refrigerant cycle 20 is maximized in order to save the electricity. Specifically, while radiated capacity Q in the heating indoor heat exchanger 12 is kept being optimized, heating COP (=the aforementioned radiated capacity Q/power W of the compressor 12) of the refrigerant cycle 20 is kept being maximized.

Figure 8:
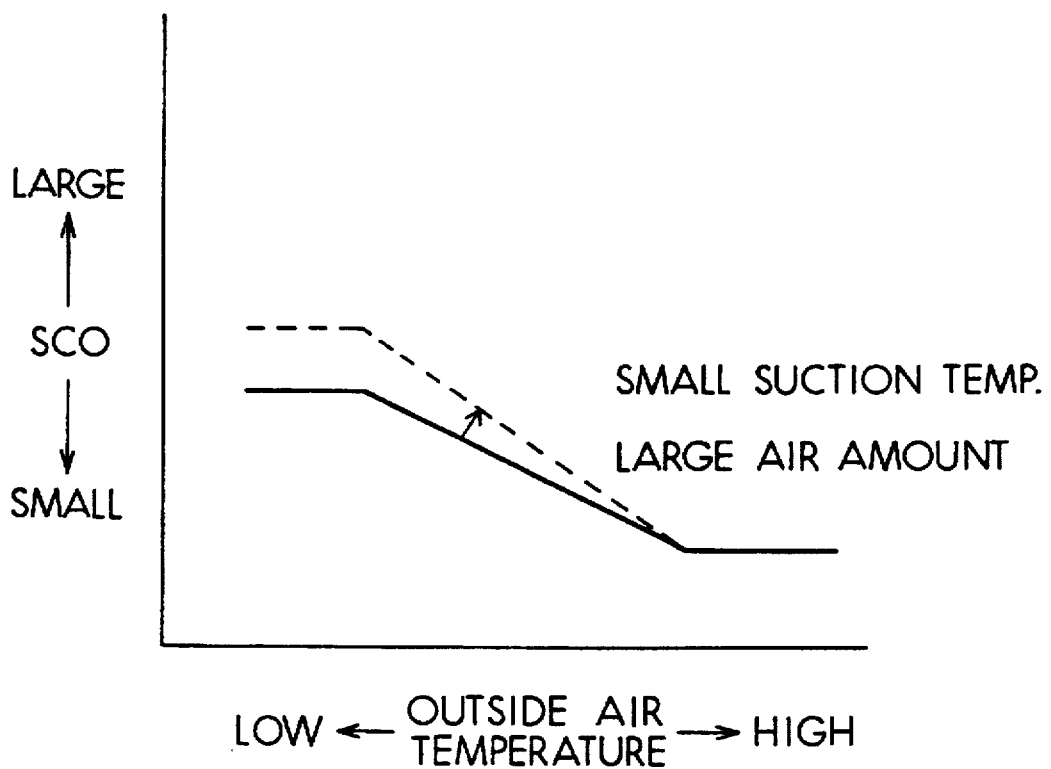
FIG. 8 is a map showing the relationship between each environmental factor and a target supercooling degree SCO in a heating operation mode of the first embodiment.

As for the calculation of SCO in this case, based on the respective signals of the outside air temperature sensor 41, the suction temperature sensor 42 and the air amount setting switch 53 which are read in at the step 120 as shown in FIG. 8, the lower the outside air temperature and the air temperature at the suction side of the heating indoor heat exchanger 12 are, and the more the air amount passing through this heat exchanger 12 is, the SCO is calculated as a larger value.

In other words, in winter when the outside air temperature is low, normally, the outside air introducing mode is set to prevent the windows from being defrosted. Therefore, in this case, the lower the outside air temperature becomes, the lower the air temperature at the suction side of the heating indoor heat exchanger 12 becomes. That is, the air temperature passing through this heat exchanger 12 becomes low. Thus, what the air temperature passing through the heat exchanger 12 is low means that a temperature difference between the refrigerant temperature in the heat exchanger 12 and the temperature of the passing air is large, i.e., it means the radiated capacity Q is large.

Therefore, SCO is calculated as a larger value, and as a result, even if the power W becomes consequently large, since the capacity Q becomes larger than that and the heating COP becomes large, so that when the outside air temperature or the suction temperature is low as described above, SCO is calculated as a larger value compared with a case when these temperatures are high.

The more the air amount passing through the heat exchanger 12 is, the lower the high pressure becomes. Thus, when the air amount is large, even if the power W becomes large when SCO is calculated as a larger value and the capacity Q is raised, the increasing ratio of the power W is small, because original high pressure itself is low compared with the case when the air amount is small. As a result, the heating COP becomes large, so that the more the air amount passing through the heat exchanger 12 is, SCO is calculated as a larger value.

At the step 240, the deviation ΔSC (=SC−SCO) is calculated. At the next step 250, based on the map of FIG. 9 stored in the ROM, increasing/decreasing opening degree ΔEVH of the expansion valve 24 for heating corresponding to the above deviation ΔSC is calculated. In such a case, the upper limit value EVH1 and the lower limit value EVH2 of ΔEVH are determined to prevent the hunting of SC.

At the step 260, the opening degree of the expansion valve 24 for heating is increased or decreased by the above ΔEVH. Then, at the step 270, it counts up the timer T2, and at the next step 280, it is determined whether or not the timer T2 has exceeded a preset time $\tau_2$. When it has not exceeded the preset time $\tau_2$, it returns to the step 270 again, however, when it has exceeded, it returns to the step 120.

Figure 5:
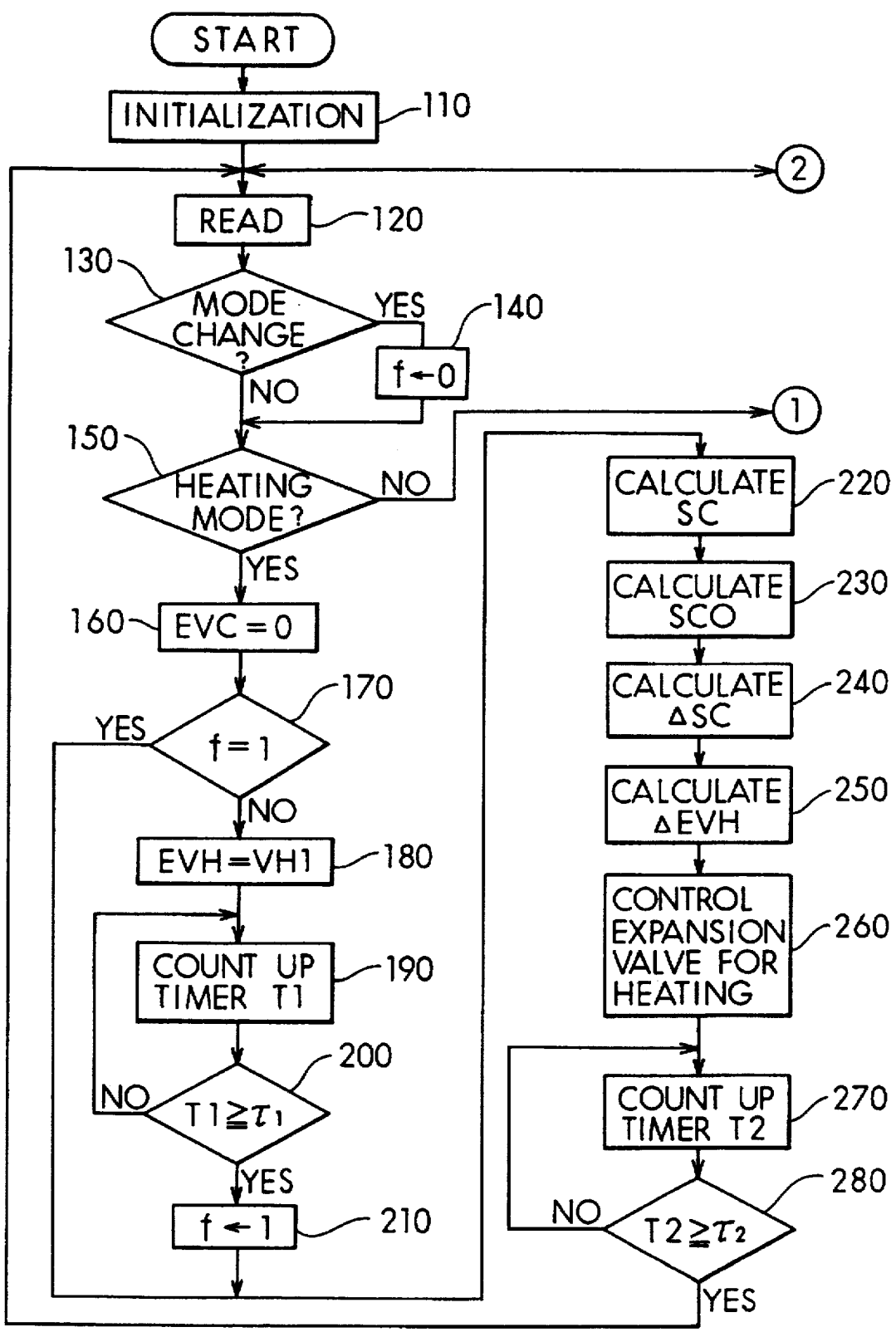
FIG. 5 is a flow chart showing a control process of the expansion valve of the first embodiment.
Figure 6:
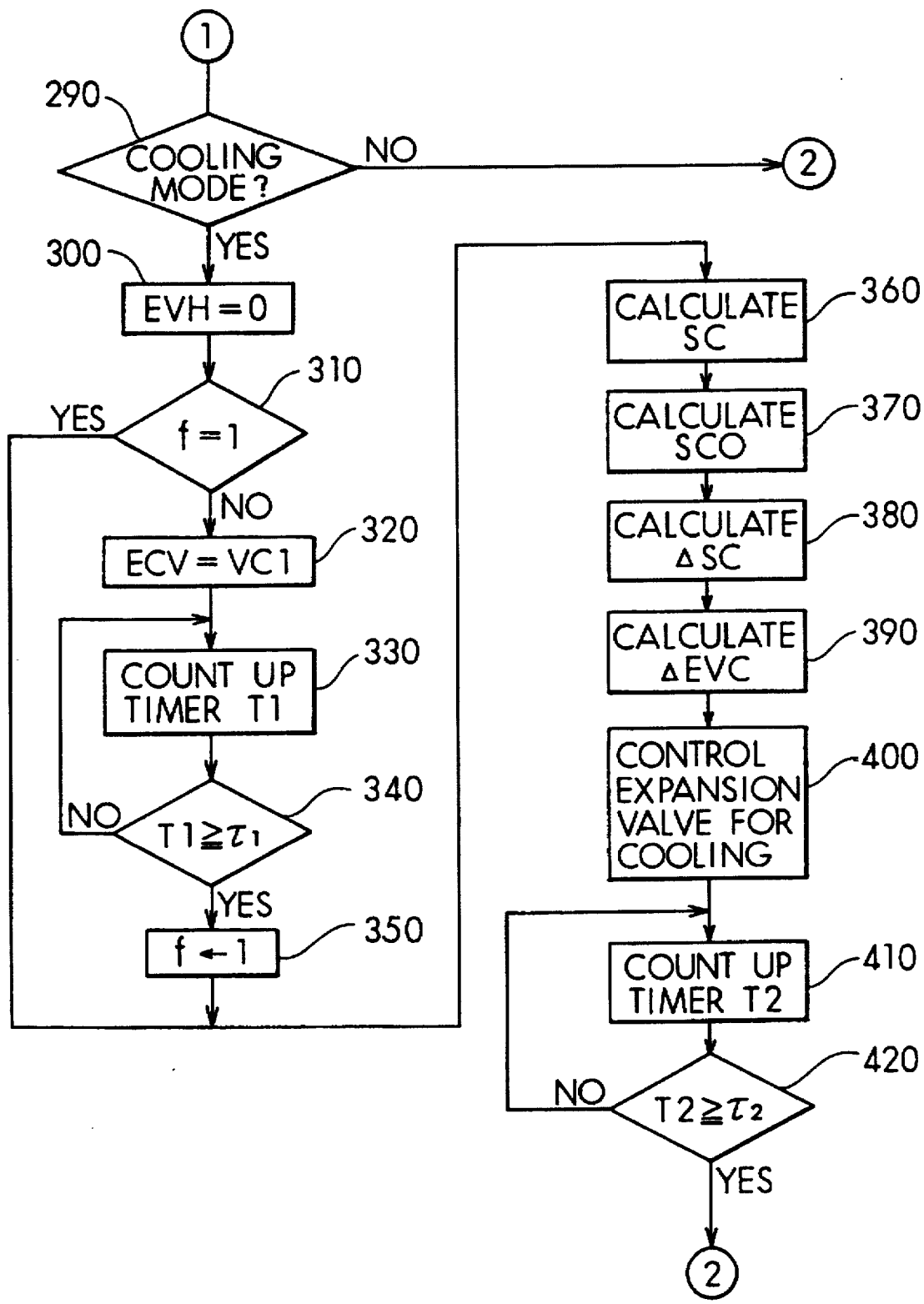
FIG. 6 is a flow chart showing a control process of the expansion valve of the first embodiment.

On the other hand, when the determination is NO at the above step 150, it jumps to the step 290 of FIG. 6, and by checking whether or not the cooler switch 55b is turned on, it is determined whether or nor the operation mode is the cooling operation mode. When the determination is NO, i.e., when the both cooling switch 55b and the heater switch 55c are not turned on, it returns to the step 120 of FIG. 5, however, when the determination is YES, at the following step 300, the opening degree EVH of the expansion valve 24 for heating is set to 0. Namely, the expansion valve 24 for heating is fully closed.

By determining whether or not the flag "f" is set at the step 310, it is determined whether or not the steps 320–340 described below have been already performed. In this case, when the flag "f" is set, i.e., it determines that the steps 320–340 have been already performed, it directly jumps to the step 360, however, when it determines that these steps 320–340 have not been performed yet, the opening degree EVC of the expansion valve 23 for cooling is maintained at the upper limit value VC1 by the time $\tau_1$.

Practically, first of all, the step 320 sets EVC to the aforementioned upper limit value VC1. At the next step 330, it counts up the timer T1, and at the following step 340, it is determined whether or not the timer T1 has exceeded the time τ1. When it determines that the timer T1 has not exceeded the time τ1, it returns to the step 330 again, however, when it determines that the timer T1 has exceeded the time τ1, after the flag "f" is set at the step 350, it moves to the step 360.

At the step 360, the supercooling degree SC of the condensed liquid refrigerant in the indoor heat exchanger 22 is calculated based on the following equation (2).

$$SC = T(Pd) - T_{OS} \qquad (2)$$

wherein $T_{OS}$ represents a detected value of the outdoor heat exchanger outlet temperature sensor 44.

At the step 370, a target value SCO of the supercooling degree is calculated. The SCO is also determined based on the same concept as in the determination at the step 230.

Figure 10:
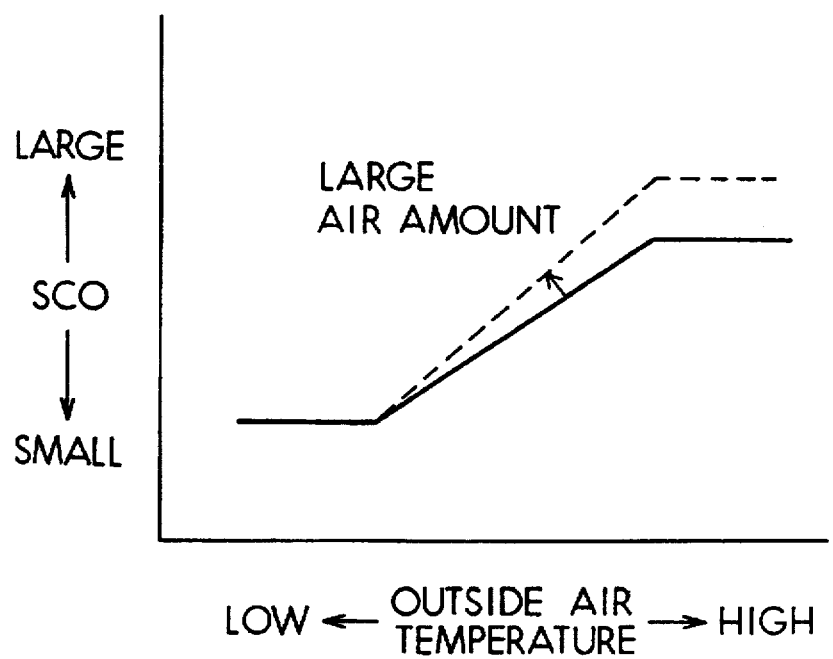
FIG. 10 is a map showing the relationship between each environment factor and a target supercooling degree SCO in the cooling operation mode of the first embodiment.
Figure 11:
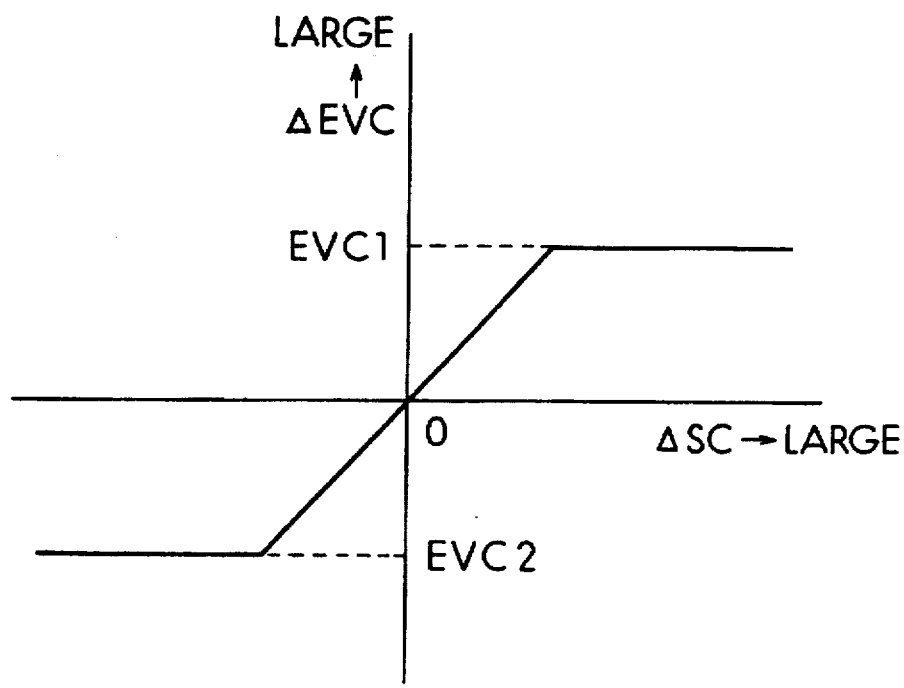
FIG. 11 is a map showing the relationship between deviations ΔSC and an increasing/decreasing opening degree of an expansion valve for cooling in the cooling operation mode.

As for the calculation of SCO in this case, the higher the outside air temperature is, and the smaller the air amount passing through the cooling indoor heat exchanger 11 is, as shown in FIG. 10, the SCO is calculated as a larger value.

In other words, in summer when the outside air temperature is generally high, the higher the outside air temperature becomes, the more the compressor 21 works to ensure cooling capacity in order to cool a passenger compartment. Therefore, the high pressure becomes higher at this time and also the refrigerant temperature in the outdoor heat exchanger 22 becomes high, accordingly a temperature difference between the refrigerant temperature and the outside air temperature consequently becomes large. In other words, the radiated capacity Q in the outdoor heat exchanger 22 becomes large.

Therefore, even if the power W of the compressor 21 becomes large as a result of calculating SCO as a larger value, since the capacity Q becomes larger than that and the cooling COP becomes large, SCO is calculated as a larger value compared with the case when these temperatures are low.

The larger the air amount passing through the cooling indoor heat exchanger 11 is, the larger the heat absorption amount in this heat exchanger 11 becomes and the larger the radiated heat amount in the indoor heat exchanger 22 becomes. Thus, even if the power W becomes large as a result of calculating SCO as a larger value, since the capacity Q becomes larger than that and the cooling COP becomes large, SCO is calculated as a large value.

At the step 380, the deviation ΔSC (=SC−SCO) is calculated. At the next step 390, based on the map of FIG. 11 stored in the ROM, increasing/decreasing opening degree ΔEVC of the expansion valve 23 for cooling corresponding to the deviation ΔSC is calculated. In this case, has the determined upper limit value EVC1 and the lower limit value EVC2 of ΔEVH are determined to prevent the hunting of SC.

At the step 400, the degree of the expansion valve 23 for cooling by the ΔEVC is increased or decreased. Then, at the step 410, it counts up the timer T2, and at the next step 420, it is determined whether or not the timer T2 has exceeded a preset time $\tau_2$. When it is determined that it has not exceeded the preset time $\tau_2$, it returns to the step 410 again, however, when it is determined that it has exceeded, it returns to the step 120.

Next, a practical operation based on the control process of the microcomputer is described with reference to a timing chart of FIG. 12 with such an example as the heating operation mode.

Until the point "$t_1$", i.e., before the time $\tau_1$ elapses after the key switch and the operation mode setting switch 55 are turned on to start the air conditioner, the valve opening degree EVH of the expansion valve 24 for heating is fixed to VH1.

Figure 9:
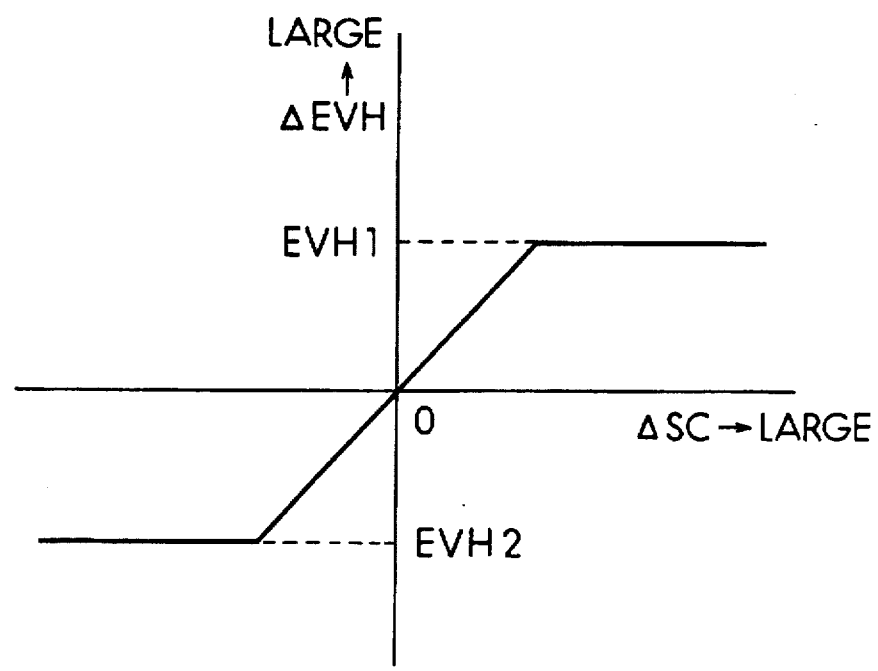
FIG. 9 is a map showing the relationship between deviations ΔSC and an increasing/decreasing opening degree of an expansion valve for heating in the heating operation mode.
Figure 12:
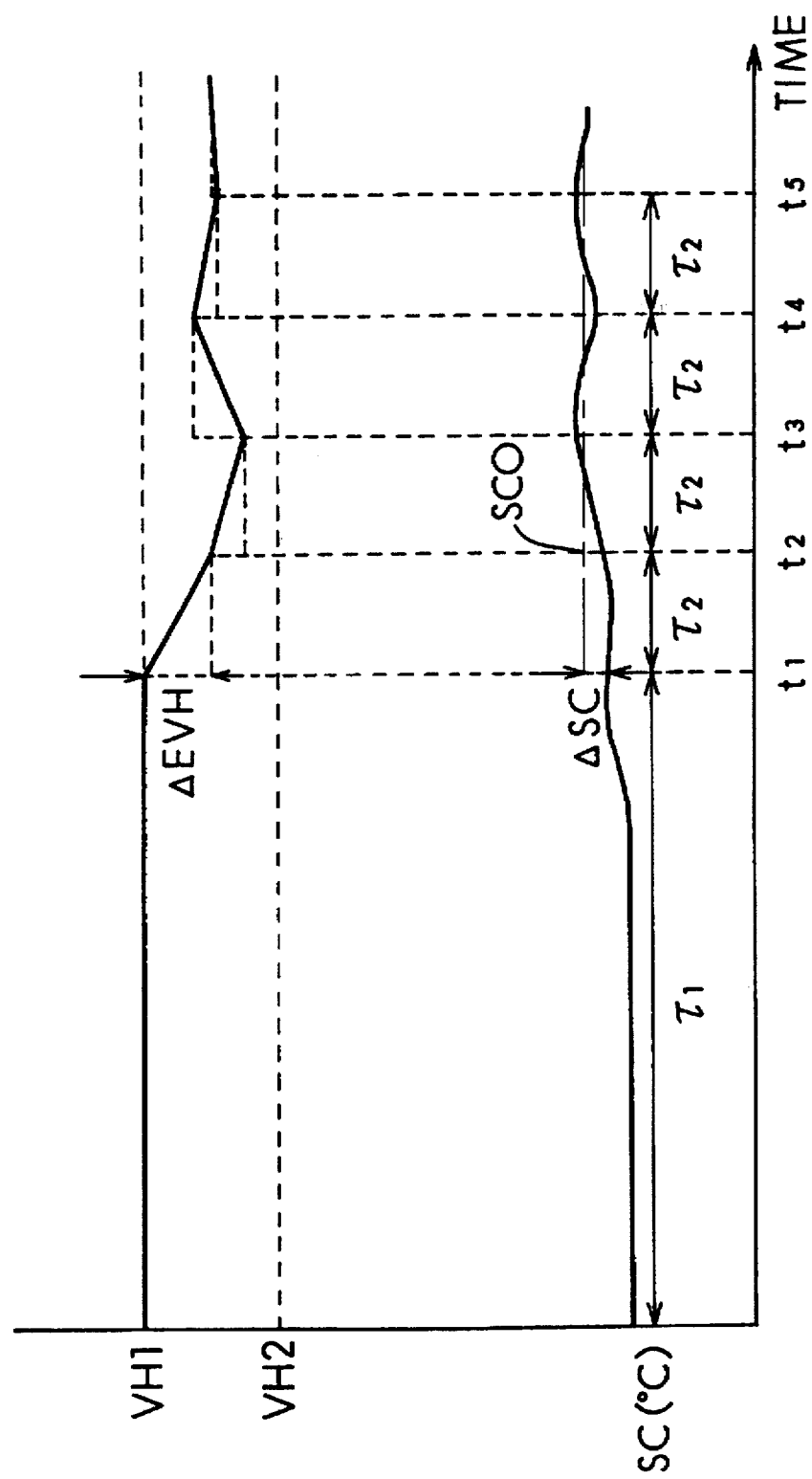
FIG. 12 is a timing chart of an opening degree of an expansion valve EVH and the supercooling degree SC in the heating operation mode of the first embodiment.

At the time of the point "$t_1$" after the time $\tau_1$ elapses, a target supercooling degree SCO is calculated, however, in an example of this FIG. 12, the supercooling degree SC at the point "$\tau_1$" is smaller than the above-specified SCO and ΔSC becomes a negative value, so that ΔEVH also becomes a negative value judging from FIG. 9. The EVH gradually becomes smaller, however, SC gradually increases. Then, EVH becomes smaller by the ΔEVH at the "$t_2$" after the time $\tau_2$.

At this point "$t_2$", since the determination is YES at the step 170 judges YES, SC, SCO, ΔSC, and ΔEVH are sequentially calculated, and EVH gradually becomes smaller, but SC gradually becomes larger. EVH becomes small by the ΔEVH at the "$t_3$" after the time $\tau_2$.

In the same manner as the above, SCO, ΔSC, and ΔEVH are consecutively calculated at the respective points "$t_3$", "$t_4$", and "$t_5$" every time, and EVH changes by the ΔEVH during the time $\tau_2$.

According to this embodiment described as the above, since condensed temperature is calculated based on the signal from a high responsive pressure sensor (discharge pressure sensor 43) compared with a temperature sensor, an error to obtain the condensed temperature can be smaller in comparison with a case where the condensed temperature is directly detected by the temperature sensor. Accordingly, in this embodiment, since the calculation error of the supercooling degree SE is reduced, control performance of an electric type pressure reducing device can be improved, thus making it possible to perform an appropriate control of the supercooling degree.

Furthermore, in this embodiment, since the condensed temperature is calculated based on the signal from the discharge pressure sensor 43 disposed between the compressor 21 and the four way valve 26, even in case both the cooling and the heating operations are performed by using the heat pump type refrigerant cycle as in this embodiment, the condensed temperature can be calculated from the signal of the same discharge pressure sensor 43, so that the number of parts can be reduced compared with a case where respective sensors for detecting the condensed temperature are disposed at a condenser (the outdoor heat changer 22) in the cooling operation mode and at a condenser (the heating indoor heat exchanger 12) in the heating operation mode.

According to this embodiment, the condensed temperature is essentially calculated based on the signal from the discharge pressure sensor 43, which is provided originally for high pressure protection and blowing air temperature control, so that another pressure sensor only for calculating the condensed temperature is not needed separately.

Still further in this embodiment, until the time $\tau_1$ elapses after the key switch and the operation mode setting switch 55 are turned on to start the air conditioner, an opening degree of the expansion valve is fixed to VH1 or VC1 in such a manner that a larger opening degree than ordinary is set (practically fully opened). Therefore, at the time of starting the air conditioner, an abnormal rise of high pressure is prevented, the efficiency of the refrigerant cycle 20 is prevented from being deteriorated, and furthermore, circulating amount of the refrigerant can be ensured, thus resulting in improvement of the start-up of the refrigerant cycle 20 and making SC close to a target value quickly.

In this embodiment, since the opening degree of the expansion valve is controlled between the upper limit value VH1 (or VC1) and the lower limit value VH2 (or VC2), the hunting of SC is prevented.

Modifications of this embodiment are described.

The upper limit value VH1 (or VC1) and the lower limit value VH2 (or VC2) of the opening degree of the expansion valve (referred to FIG. 2) can be changed depending on an environmental condition. For example, when a load within the passenger compartment is large, the upper limit value VH1 (VC1) may be a larger value compared with a small load, and also VH2 (or VC2) may be made larger according to this.

The times $\tau_1$ and $\tau_2$ may be changed depending on an environmental condition. For example, when a load within the passenger compartment is large at the initial time to start the air conditioner, the time $\tau_1$ may be made larger than a small load, and also when ΔEVH is large, the time τ₂ may be made larger than small ΔEVH.

Still further, in the above embodiment, the case where the refrigerant cycle operation mode is controlled manually is described, however, it may be similarly applied to an automatic control.

In addition, the higher the set temperature by the temperature setting lever 56 is at the time of heating, or the lower the set temperature is at the time of cooling, the SCO may be calculated as a larger value. In case that means for setting the rotation speed of the compressor is disposed, the higher the set rotation speed of the compressor is, the SCO may be calculated as a higher value.

Figure 15:
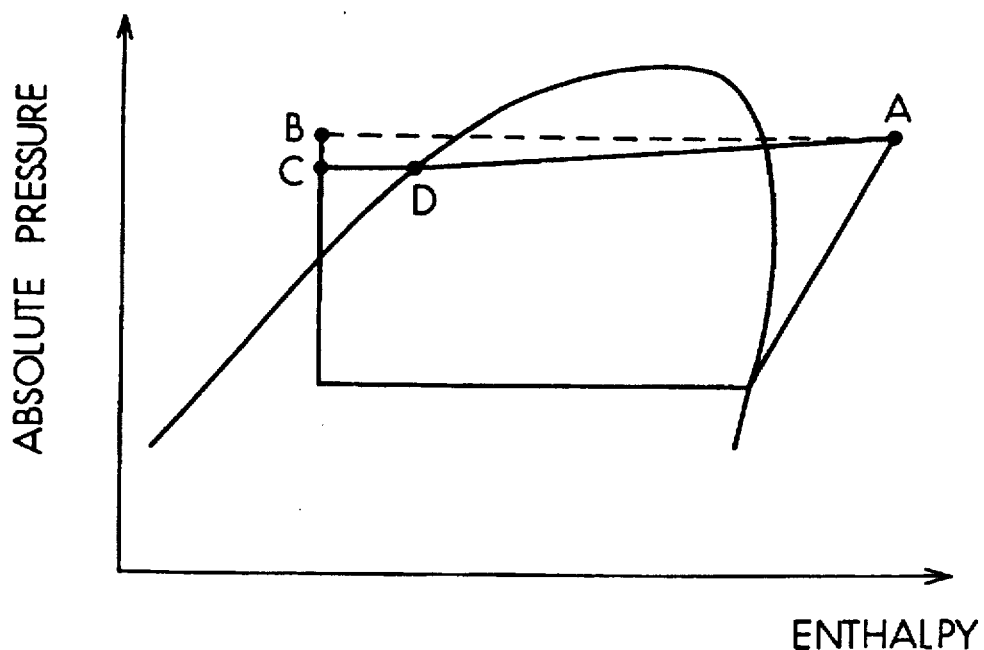
FIG. 15 is a Mollier chart of a refrigerant cycle of the second embodiment.
Figure 13:
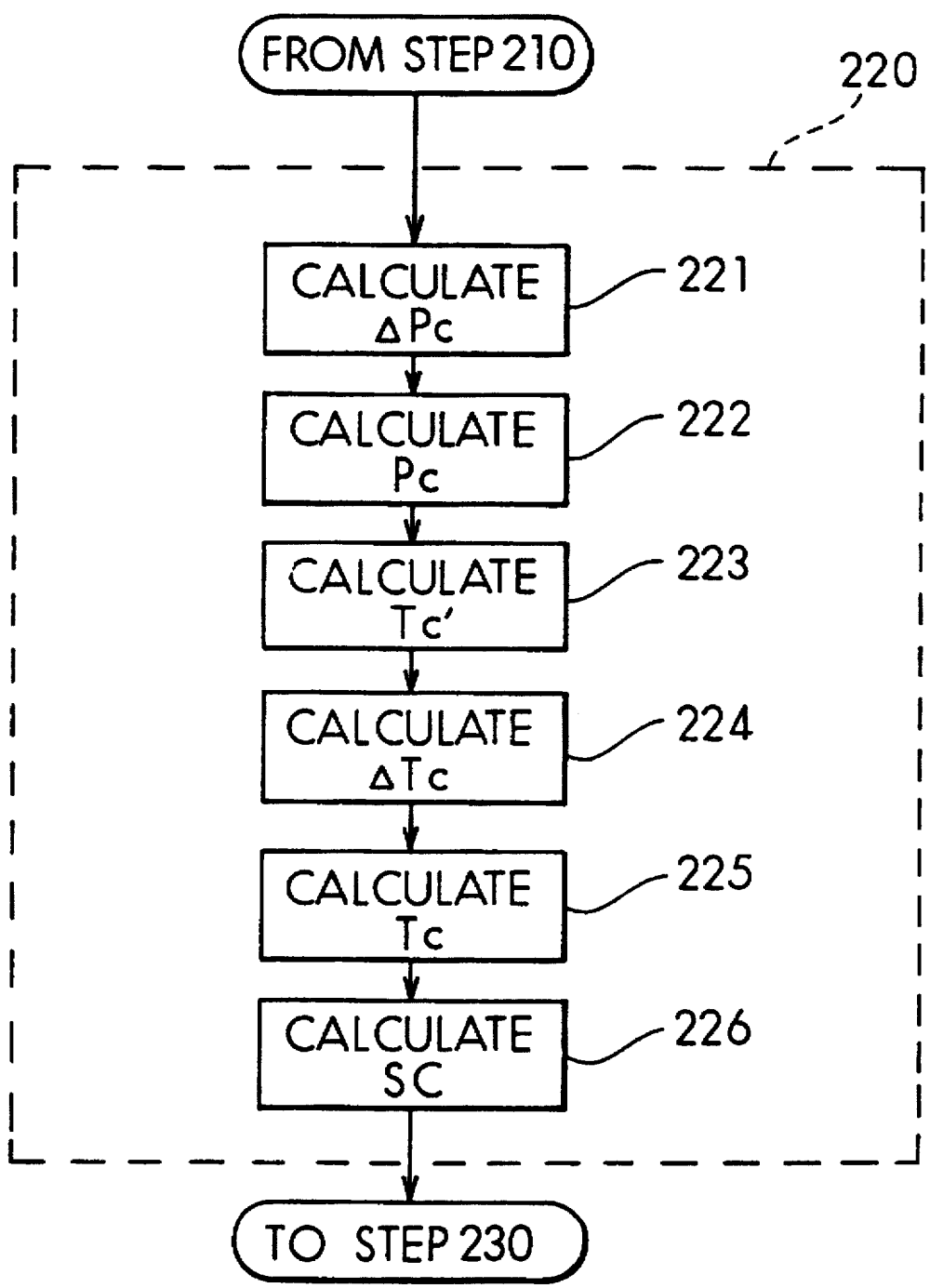
FIG. 13 is a flow chart showing a calculation process of the supercooling degree SC in the heating operation mode according to a second embodiment.
Figure 14:
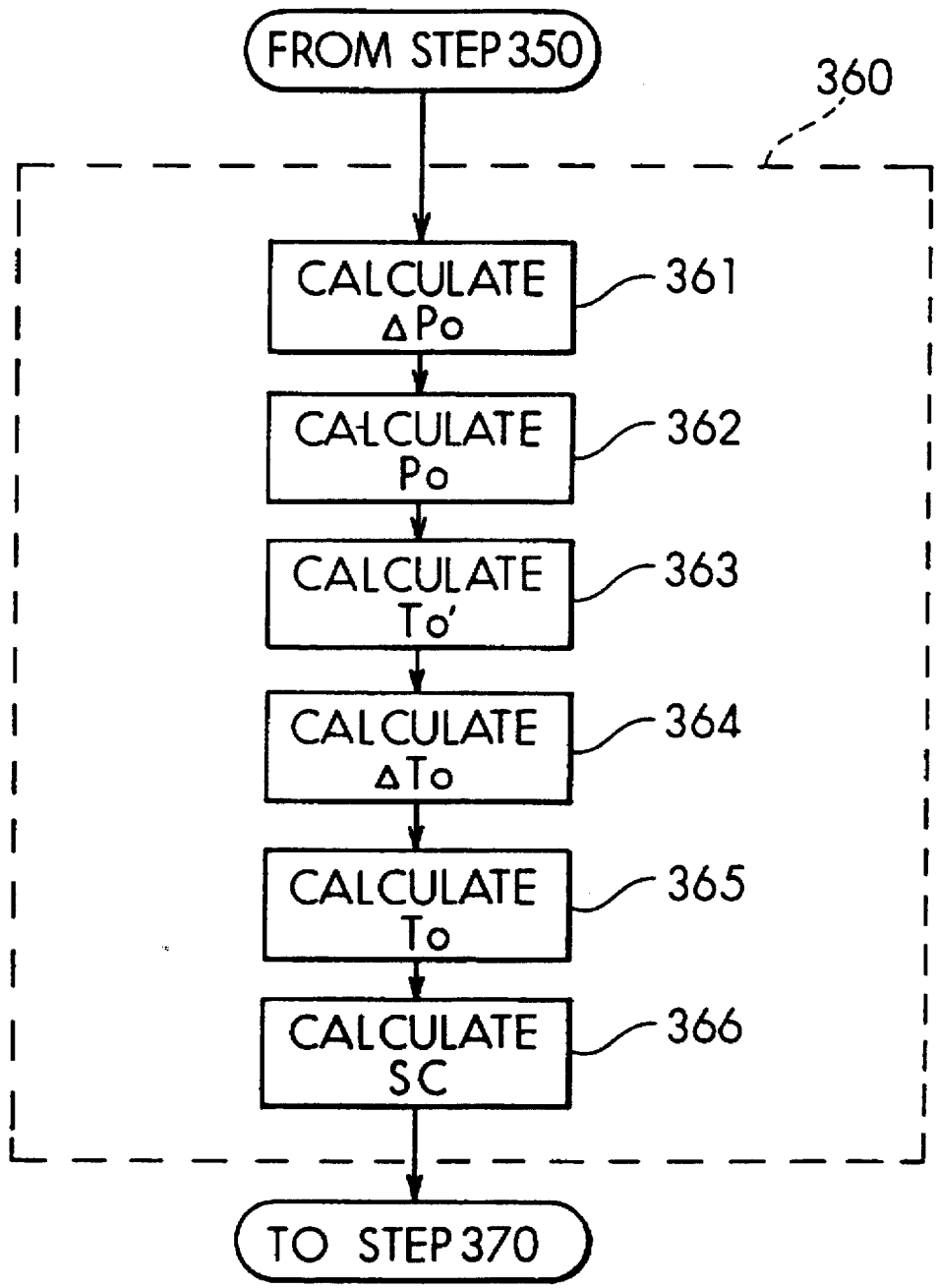
FIG. 14 is a flow chart showing a calculation process of the supercooling degree SC in the cooling operation mode according to the second embodiment.

A second embodiment of the present invention is described with respect to FIGS. 13–15.

In the second embodiment, the supercooling degree SC of the condensed liquid refrigerant in the heating indoor heat exchanger 12 at the step 220 in FIG. 5 and the target value SCO of the supercooling degree at the step 370 in FIG. 6 are calculated as follows.

Hereinafter, contents of the detailed process at the step 220 is described with reference to FIG. 13.

At the step 221, a pressure loss ΔPc of the refrigerant from the position where the discharge pressure sensor 43 is disposed to the position where the indoor heat exchanger outlet temperature sensor 45 is disposed by substituting the target rotation speed Nc of the compressor 21 stored in RAM and the detected value Tos of the outdoor heat exchanger outlet temperature sensor 44 read in at the step 120 for the following equation (3).

The pressure loss ΔPc is a difference between the refrigerant pressure at the point "C" and the refrigerant pressure at the point "B" in the Mollier chart of the refrigerant cycle 20 shown in FIG. 15. The pressure at the point "A" is a refrigerant pressure detected by the discharge pressure sensor 43, whereas the pressure at the point "B" is a refrigerant pressure (=pressure at the point "A") at the position where the indoor heat exchanger outlet temperature sensor 45 is disposed in case the above-described pressure loss ΔPc is ignored. The pressure at the point "C" is a refrigerant pressure at the position where the interior heat exchanger outlet temperature sensor 45 is disposed in case the above-described ΔPc is taken into account.

$$\Delta Pc = A \times Nc^m \times Tos^n \qquad (3)$$

The equation (3) is an approximate equation obtained by an experiment. The above "A", "m", and "n" are experimental constants, respectively.

In the equation (3), m is set to be larger than zero (m>0) so that the higher the rotation speed Nc becomes, the larger the pressure loss ΔPc becomes, that is, the lower the rotational speed Nc becomes, the smaller the pressure loss ΔPc becomes. Furthermore, n is set to be larger than 0 so that the higher the outlet temperature Tos becomes, the larger the pressure loss ΔPc becomes, that is, the lower the outlet temperature Tos becomes, the smaller the pressure loss ΔPc becomes.

In other words, the higher the rotational speed Nc of the compressor 21 becomes, the larger the flowing amount of the refrigerant circulating in the refrigerant cycle and the flowing speed of the refrigerant at the high pressure side of the refrigerant cycle 21 becomes fast, which causes larger pressure loss at the high pressure side. Therefore, in the second embodiment, the higher the rotational speed of the compressor becomes, the larger the pressure loss ΔPc is, whereas, the smaller the pressure loss ΔPc is, the lower the rotational speed Nc becomes.

Furthermore, the higher the outlet temperature Tos becomes, that is, the higher the pressure of the refrigerant at the low pressure side of the refrigerant cycle 20 becomes, the larger the specific gravity of the refrigerant becomes and the larger the weight flowing amount of the refrigerant flowing at the high pressure side of the refrigerant cycle 21, which causes large pressure loss at this high pressure side. In this embodiment, the higher the outlet temperature Tos becomes, the larger the pressure loss ΔPc is, whereas, the lower the outlet temperature Tos becomes, the smaller the pressure loss ΔPc is.

At the next step 222, an outlet refrigerant pressure Pc (pressure at the point "C" of FIG. 15) at the position where the indoor heat exchanger outlet temperature sensor 45 is disposed is calculated by substituting a detected value Pd of the discharged pressure sensor 43, i.e., the pressure at the point "A" (=pressure at the point "B") of FIG. 15 and the pressure loss ΔPc with the following equation (4).

At the step 220, the supercooling degree SC of the condensed liquid refrigerant in the heating indoor heat exchanger 12 is calculated, based on the following equation (4).

$$PC = Pd - \Delta Pc \qquad (4)$$

At the next step 223, temperature Tc' (temperature at the point "D") of saturated liquid refrigerant of dryness zero (0) in the heating indoor heat exchanger 12 corresponding to the above-described outlet refrigerant pressure Pc (pressure at the point "C") is calculated by searching from the map (not shown) showing the relationship between the refrigerant pressure and the saturated liquid refrigerant temperature of dryness zero (0), which is stored in ROM.

In short, the refrigerant is in a state of supercooled liquid from the point "D" to the point "C". In this case, since the pressure loss in the refrigerant pipe of such liquid refrigerant is so small that it can be ignored, the refrigerant pressure at the point "C" and the refrigerant pressure at the point "D" can be regarded as equal. For this reason, according to this embodiment, by calculating saturated liquid refrigerant temperature Tc' from the calculated pressure of the point "C", the temperature Tc' is equal to Tc' which is calculated from the pressure of the point "D".

At the next step 224, a difference between the detected outlet refrigerant temperature Tcs and the actual outlet refrigerant temperature is calculated as a compensation value ΔTc by substituting the detected value of the outside air temperature sensor 41 and the outlet refrigerant temperature Tcs (refrigerant temperature at the point "C" of FIG. 15) detected by the indoor heat exchanger outlet temperature sensor 45 with the following equation (5).

$$\Delta Tc = a \times (Tcs - Tam) \qquad (5)$$

The equation (5) is an approximate equation obtained by an experiment. The "a" is an experimental constant.

At the next step 225, more accurate outlet refrigerant temperature is calculated as compensated outlet refrigerant temperature Tc based on the following equation (6) by adding the compensation value ΔTc calculated at the detected outlet refrigerant temperature Tcs.

$$Tc = Tcs + \Delta Tc \qquad (6)$$

Here, according to the above equation (5), the lower the outside air temperature Tam becomes, the larger the compensation value ΔTc, in other words, the higher the outside air temperature Tam becomes, the compensation value ΔTc smaller. Therefore, the compensated outlet refrigerant temperature Tc obtained by the above equation (6) becomes higher than the detected outlet refrigerant temperature Tcs when the outside temperature Tam becomes lower, on the other hand, when the outside temperature becomes higher, its temperature becomes closer to the detected outlet refrigerant temperature Tcs.

At the next step 226, the above supercooling degree SC is calculated by substituting the temperature Tc' (temperature at the point "D") of the saturated liquid refrigerant calculated at the step 223 and the compensated outlet refrigerant temperature Tc (Temperature at the point "C") calculated at the step 225 with the following equation (7).

$$SC=Tc'-Tc \qquad (7)$$

Next, contents of the detailed process at the step 360 is described with reference to FIG. 14.

At the step 360, the supercooling degree SC of the condensed liquid refrigerant in the outside heat exchanger 22 is calculated.

At the step 361, the pressure loss $\Delta$Po of the refrigerant from the position where the discharge pressure sensor 43 is disposed to the position where the outdoor heat exchanger outlet temperature sensor 44 is disposed is calculated by substituting the aforementioned rotation speed Nc of the compressor contained in RAM and the detected value Te of the post evaporator sensor 46 read in at the step 120 with the following equation (8). Here, the pressure loss $\Delta$Po is a difference between the pressure B and the pressure at the point "C" of FIG. 15 in the same manner as in the heating operation mode.

$$\Delta Po=B \times Nc^k \times Te^l \qquad (8)$$

The equation (8) is an approximate equation obtained by an experiment. The "B", "k", and "l" are experimental constants, respectively.

In the equation (8), in the same manner as in the heating operation mode, k is set to be larger than zero (k>0) so that the higher the rotation speed Nc can become, the larger the pressure loss $\Delta$Pc becomes, that is, the lower the rotation speed Nc becomes, the smaller the pressure loss $\Delta$Pc becomes. Furthermore, l is set to be larger than zero (0) so that the higher the temperature Te becomes, the larger the pressure loss $\Delta$Pc becomes, that is, the lower the temperature Te becomes, the smaller the pressure loss $\Delta$Pc becomes. Since the reason is the same as in the heating operation mode, the explanation is omitted.

At the next step 362, the outlet refrigerant pressure Po (pressure at the point "C" of FIG. 9) in the position where the outdoor heat exchanger outlet temperature sensor 44 is disposed is calculated by substituting a detected value Pd of the discharged pressure sensor 43 and the pressure loss $\Delta$Po with the following equation (7).

$$Po=Pd-\Delta Pc \qquad (7)$$

At the next step 363, temperature To' (temperature at the point D) of saturated liquid refrigerant of dryness zero (0) in the outdoor heat exchanger 22 corresponding to the above-described outlet pressure Pc (pressure at the point "C") by searching from the map (not shown) showing the relationship between the refrigerant pressure and the saturated liquid refrigerant temperature of dryness zero (0), which is stored in ROM.

In this case, in the same manner as in the heating operation mode, since the refrigerant pressure at the point "C" and the refrigerant pressure at the point "D" can be regarded as equal, according to this embodiment, by calculating Tc' from the calculated pressure at the point "C", the temperature Tc' is equal to Tc', which is calculated from the pressure at the point "D".

At the next step 364, a difference between this detected outlet refrigerant temperature Tos and the actual outlet refrigerant temperature is calculated as a compensation value $\Delta$To by substituting the detected value Tam of the outside air temperature sensor 41 and the outlet refrigerant temperature Tcs (refrigerant temperature at the point "C" of FIG. 15) detected by the outdoor heat exchanger outlet temperature sensor 44 with the following equation (8).

$$\Delta To=b \times (Tos-Tam) \qquad (8)$$

This equation (8) is an approximate equation obtained by an experiment. The "b" is an experimental constant.

At the next step 365, more accurate outlet refrigerant temperature is calculated as a compensated outlet refrigerant temperature To by adding the compensation value $\Delta$To calculated at the aforementioned step 364 to the detected value tos as shown in the following equation (11).

$$To=Tos+\Delta To \qquad (11)$$

Here, the above equations (10) and (11) are formed based on the same concept as in the heating operation mode.

At the next step 366, the supercooling degree SC is calculated by substituting the saturated liquid refrigerant temperature To7 (temperature at the point "D") calculated at the step 363 and the compensated outlet refrigerant temperature To (temperature at the point "C") calculated at the step 365 with the following equation (12).

$$SC=To'-To \qquad (12)$$

The other steps are same as in the first embodiment.

According to this embodiment described above, since temperature Tc' (or To') (temperature at the point "D" of FIG. 15) of the saturated liquid refrigerant of dryness zero (0) in the condenser is calculated based on a detected value Pd of the discharged pressure sensor 43, provided originally for the high pressure protection and the blowing air temperature control, and the pressure loss $\Delta$Pc (or $\Delta$Po) from the position where the discharge pressure sensor 43 is disposed to the position where the outlet temperature sensor 45 (or 44) is disposed, the higher responsibility can be obtained as compared with the case where the saturated liquid refrigerant temperature is obtained by a temperature sensor, it is not necessary to provide a separate sensor, and it can be calculated with high accuracy.

An error in the calculation of the supercooling degree SC calculated by a difference between the saturated liquid refrigerant temperature Tc' (or To') and the outlet refrigerant temperature Tc (or To) at the position where the outlet temperature sensor 45 (44) is disposed can be reduced, thereby improving the control performance of the expansion valve 24 (or 23) and making it possible to perform an appropriate control of the supercooling degree.

Further, according to this embodiment, since the outlet refrigerant temperature Tc (or To) is obtained by compensating temperature Tcs (or Tos) detected by the outlet temperature sensor 45 (or 44) corresponding to the outside air temperature, the outlet refrigerant temperature can be more accurately obtained. Accordingly, the error in the calculation of the supercooling degree SC is reduced, control performance of the expansion valve 24 (or 23) is improved, and furthermore, an appropriate control of the supercooling degree can be performed.

Modifications of this embodiment are described.

In the above embodiment, as for detecting the refrigerant physical amount at the low pressure side, the temperature of the refrigerant flowing in the heat exchanger functioning as an evaporator is detected by an outdoor heat exchanger outlet temperature sensor 44 in the heating operating mode and by the post evaporator sensor 46 in the cooling operation mode, however, the pressure of the refrigerant flowing in this heat exchanger may be employed.

According to the above embodiment, the rotational speed detecting means is composed of RAM, however, a sensor for directly detecting the rotation speed of the compressor 21 is provided and this sensor may be employed as the rotational speed detecting means.

Furthermore, in the above embodiment, a heat pump type refrigerant cycle is employed, however, the refrigerant cycle may be made of a single cooler or single heater.

In the above embodiments, the present invention is applied to an air conditioner for an electric vehicle, however, it may be applied to an air conditioner for a vehicle driven by an engine as well as an air conditioner for a room in a housing or building.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioning apparatus for conditioning air in a compartment, comprising:

a casing having an air passage, in which an inside air inlet for sucking the inside air and an outside air inlet sucking the outside air are formed at one end thereof and an air outlet communicating with said compartment at the other end;

a refrigeration cycle having a compressor for compressing refrigerant, a condenser disposed in said air passage for condensing the refrigerant from said compressor, an electric type pressure reducing device for reducing a pressure of the refrigerant from said condenser, an evaporator for evaporating the refrigerant from said electric type pressure reducing device;

a blower for generating an air flow in said air passage;

outlet temperature detecting means detecting outlet refrigerant temperature of said condenser, high pressure detecting means for detecting high pressure of said refrigerant cycle; and a control unit for controlling said electric type pressure reducing device so that a supercooling degree of liquid refrigerant in said condenser is set to a predetermined target supercooling degree, said control unit including:

supercooling degree calculating means for calculating said supercooling degree of condensed liquid refrigerant in said condenser based on the condensed temperature calculated from said high pressure detected by said high pressure detecting means and said outlet refrigerant temperature detected by said outlet temperature detecting means, and supercooling degree controlling means for controlling said electric type pressure reducing device in such a manner that said supercooling degree calculated by said supercooling degree calculating means is set to said target supercooling degree.

2. An air conditioning apparatus according to claim 1, further comprising:

outside air temperature detecting means for detecting the outside air temperature; and target supercooling degree calculating means calculating said target supercooling degree as a larger value in accordance with the decrease of said outside air temperature detected by said outside air temperature detecting means.

3. An air conditioning apparatus according to claim 1, further comprising:

suction temperature detecting means for detecting suction air temperature of said condenser in said air passage; and target supercooling degree calculating means for calculating said target supercooling degree as a larger value in accordance with the decrease of said sucktion air temperature detected by said suction temperature detecting means.

4. An air conditioning apparatus according to claim 1, further comprising:

air amount detecting means for detecting air amount passing through said condenser; and target supercooling degree calculating means for calculating said target supercooling degree as a larger value in accordance with the increase of said air amount detected by said air amount detecting means.

5. An air conditioning apparatus according to claim 1, further comprising:

initial opening degree control means for setting said electric type pressure reducing device to a larger set opening degree than an ordinary control for a predetermined time after said air conditioning apparatus is started; wherein, said supercooling degree control means controls said electric type pressure reducing device in such a manner that said calculated supercooling degree is set to said target supercooling degree after said predetermined time has elapsed.

6. An air conditioning apparatus according to claim 1, wherein said air conditioning apparatus is employed for a vehicle.

7. An air conditioning apparatus for conditioning air in a compartment, comprising:

a casing having an air passage, in which an inside air inlet for sucking the inside air and an outside air inlet sucking the outside air are formed at one end thereof and an air outlet communicating with said compartment at the other end;

a refrigeration cycle having a compressor for compressing refrigerant, a condenser disposed outside said air passage for condensing the refrigerant from said compressor, an electric type pressure reducing device for reducing a pressure of the refrigerant from said condenser, an evaporator disposed in said air passage for evaporating the refrigerant from said electric type pressure reducing device;

a blower for generating an air flow in said air passage;

outlet temperature detecting means detecting outlet refrigerant temperature of said condenser, high pressure detecting means for detecting high pressure of said refrigerant cycle; and a control unit for controlling said electric type pressure reducing device so that a supercooling degree of liquid refrigerant in said condenser is set to a predetermined target supercooling degree, said control unit including:

supercooling degree calculating means for calculating said supercooling degree of condensed liquid refrigerant in said condenser by calculating the condensed temperature from said high pressure detected by said high pressure detecting means based on said condensed temperature and said outlet refrigerant temperature detected by said outlet temperature detecting means, and supercooling degree controlling means for controlling said electric type pressure reducing device in such a manner that said supercooling degree calculated by said supercooling degree calculating means is set to said target supercooling degree.

8. A refrigeration cycle control apparatus comprising:

a refrigeration cycle having a compressor for compressing refrigerant, a condenser for condensing the refrigerant from said compressor, an electric type pressure reducing device for reducing a pressure of the refrigerant from said condenser, an evaporator for evaporating the refrigerant from said electric type pressure reducing device;

high pressure detecting means for detecting high pressure of said refrigerant cycle;

outlet temperature detecting means for detecting outlet refrigerant temperature of said condenser; and a control unit for controlling said electric type pressure reducing device so that a supercooling degree of liquid refrigerant in said condenser is set to a predetermined target supercooling degree, said control unit including:

supercooling degree calculating means for calculating said supercooling degree of condensed liquid refrigerant in said condenser by calculating the condensed temperature from said high pressure detected by said high pressure detecting means based on said condensed temperature and said outlet refrigerant temperature detected by said outlet temperature detecting means, and supercooling degree controlling means for controlling said electric type pressure reducing device in such a manner that said supercooling degree calculated by said supercooling degree calculating means is set to said target supercooling degree.

9. An air conditioning apparatus according to claim 8, further comprising:

air amount detecting means for detecting air amount passing through said evaporator; and target supercooling degree calculating means for calculating said target supercooling degree as a larger value in accordance with the increase of said air amount detected by said air amount detecting means.

10. A refrigeration cycle control apparatus comprising:

a refrigeration cycle having a compressor for compressing refrigerant, a condenser for condensing the refrigerant from said compressor, an electric type pressure reducing device for reducing a pressure of the refrigerant from said condenser, an evaporator for evaporating the refrigerant from said electric type pressure reducing device;

high pressure detecting means for detecting high pressure of said refrigerant cycle;

outlet temperature detecting means for detecting outlet refrigerant temperature of said condenser; and supercooling degree calculating means for calculating a supercooling degree of condensed liquid refrigerant in said condenser based on said condensed temperature calculated from said high pressure detected by said high pressure detecting means and said outlet refrigerant temperature detected by said outlet temperature detecting means.

11. A supercooling degree calculating device comprising:

a heat pump type refrigerant cycle having a compressor, a four way valve, an outdoor heat exchanger, an electric type pressure reducing device for cooling, an electric type pressure reducing device for heating, indoor heat exchanger, and an accumulator, each of which is connected with a refrigerant pipe, in which refrigerant circulates through said compressor, said four way valve, said indoor heat exchanger, said electric type pressure reducing device for heating, said outdoor heat exchanger and said accumulator in this order in a heating operation mode, and circulates through said compressor, said four way valve, said outdoor heat exchanger, said electric type pressure reducing device for cooling, said indoor heat exchanger and said accumulator in this order in a cooling operation mode;

a high pressure detecting means for detecting high pressure of said refrigerant cycle; and outlet temperature detecting means for detecting the outlet refrigerant temperature of said condensers, wherein supercooling degree calculating means for calculating a supercooling degree of condensed liquid refrigerant in said condenser based on said condensed temperature calculated from said high pressure detected by said high pressure detecting means and said outlet refrigerant temperature detected by said outlet temperature detecting means.

12. A supercooling degree calculating device according to claim 11, wherein:

said high pressure detecting means is disposed between said compressor and said four way valve.

13. A refrigeration cycle control apparatus comprising:

a refrigeration cycle having a compressor for compressing refrigerant, a condenser for condensing the refrigerant from said compressor, an electric type pressure reducing device for reducing a pressure of the refrigerant from said condenser, an evaporator for evaporating the refrigerant from said electric type pressure reducing device;

discharge pressure detecting means disposed at the portion of discharged side of said compressor and detecting the refrigerant pressure at the portion of this discharged side;

outlet temperature detecting means for detecting outlet refrigerant temperature of said condenser;

pressure loss physical amount detecting means detecting a physical amount related to the pressure loss of the refrigerant from a position where said discharged pressure detecting means is disposed to a position where said outlet temperature detecting means is disposed; and a control unit for controlling said electric type pressure reducing device so that a supercooling degree of liquid refrigerant in said condenser is set to a predetermined target supercooling degree, said control unit including:

pressure loss calculating means for calculating a pressure loss of the refrigerant from said position where said discharge pressure detecting means is disposed to said position where said outlet temperature detecting means is disposed based on said physical amount detected by said pressure loss physical amount detecting means, outlet pressure calculating means for calculating an outlet refrigerant pressure at said outlet side of said condenser based on said pressure loss calculated by said pressure loss calculating means and said discharge pressure detected by said discharge pressure detecting means, saturated liquid refrigerant temperature calculating means for calculating temperature of saturated liquid refrigerant of dryness zero (0) in said condensers based on said outlet refrigerant pressure calculated by said outlet pressure calculating means, supercooling degree calculating means for calculating said supercooling degree based on said saturated liquid refrigerant temperature of dryness zero (0) calculated by said saturated liquid refrigerant temperature calculating means and said outlet refrigerant temperature detected by said outlet temperature detecting means, and supercooling degree control means for controlling said electric type pressure reducing device in such a manner that said supercooling degree calculated by said excessive cooling degree calculating means is set to said target excessive cooling degree.

14. A refrigeration cycle control apparatus according to claim 13, wherein said pressure loss physical amount detecting means detects a rotational speed of said compressor.

15. A refrigeration cycle control apparatus according to claim 14, wherein said pressure loss calculating means calculates said pressure loss as a larger value in accordance with the increase of said rotational speed of said compressor detected by said compressor rotation speed detecting means.

16. A refrigeration cycle control apparatus according to claim 13, wherein said pressure loss physical amount detecting means detects a physical amount related to temperature or pressure of the refrigerant at a low pressure side of said refrigerant cycle.

17. A refrigeration cycle control apparatus according to claim 16, wherein said pressure loss calculating means calculates said pressure loss as a larger value in accordance with the increase of said temperature or pressure of said refrigerant at the low pressure side detected by said low pressure side refrigerant physical amount detecting means.

18. A refrigeration cycle control apparatus according claim 13, further comprising:

ambient temperature detecting means for detecting an ambient temperature of said outlet temperature detecting means;

compensated outlet temperature calculating means for calculating compensated outlet refrigerant temperature based on said ambient temperature detected by said ambient temperature detecting means and said outlet refrigerant temperature detected by said outlet temperature detecting means; wherein, said supercooling degree calculating means calculates said supercooling degree based on said saturated liquid refrigerant temperature of dryness zero (0) calculated by said saturated liquid refrigerant temperature calculating means and said compensated outlet refrigerant temperature calculated by said compensated outlet temperature calculating means.

19. A refrigeration cycle control apparatus according to 18, wherein said compensated outlet temperature calculating means calculates said compensated outlet refrigerant temperature as a larger value in accordance with the decrease of said ambient temperature detected by said ambient temperature detecting means.

20. A refrigeration cycle control apparatus according to 18, wherein said condenser is disposed outside; and said ambient temperature detecting means detects an outside air temperature.

21. A refrigeration cycle control apparatus comprising:

a refrigeration cycle having a compressor for compressing refrigerant, a condenser for condensing the refrigerant from said compressor, an electric type pressure reducing device for reducing a pressure of the refrigerant from said condenser, an evaporator for evaporating the refrigerant from said electric type pressure reducing device;

discharge pressure detecting means disposed at a discharged side of said compressor for detecting a refrigerant pressure at said discharge side;

outlet temperature detecting means disposed at an outlet side of said condenser for detecting outlet refrigerant temperature at said outlet side;

an ambient temperature detecting means for detecting an ambient temperature of said outlet temperature detecting means; and a control unit for controlling said electric type pressure reducing device so that a supercooling degree of liquid refrigerant in said condenser is set to a predetermined target supercooling degree, said control unit including:

saturated liquid refrigerant temperature calculating means calculating the saturated liquid refrigerant temperature of dryness zero (0) in said condensers based on said discharge pressure detected by said discharge pressure detecting means, compensated outlet temperature calculating means for calculating compensated outlet refrigerant temperature based on said ambient temperature detected by said ambient temperature detecting means and said outlet refrigerant temperature detected by said outlet temperature detecting means, and supercooling degree calculating means for calculating said supercooling degree based on said saturated liquid refrigerant temperature of dryness zero (0) calculated by said saturated liquid refrigerant temperature calculating means and said compensated outlet refrigerant temperature calculated by said compensated outlet refrigerant temperature calculating means.

* * * * *

UNITED STATES PATENT AND TRADEMARK OFFICE
CERTIFICATE OF CORRECTION

PATENT NO. : 5,701,753

DATED : December 30, 1997

INVENTOR(S) : Kunio Iritani

It is certified that error appears in the above-identified patent and that said Letters Patent is hereby corrected as shown below:

Title page, [56] References cited, add "JP 3170753 7/1991--

Title page, [57] Abstract Line 5, "condense" should be --condensed--

Col. 3, line 12, "invention.," should be --invention,--

Col. 4, line 11, "rises" should be --rise--

Col. 4, line 32, "structural" should be --structure--

Col. 4, line 56, "environment" should be --environmental--

Col. 7, line 6, "unit 40, in" should be --unit 40. In--

Col. 8, line 59, delete "or"

Col. 9 line 18, "$T_s$" should be --$T_{cs}$--

Col. 10, line 38, delete "the both" and substitute --both of the-- therefor

Col. 10, line 56, "$\tau 1$" should be --$\tau_1$--

Col. 10, line 57, "$\tau 1$" should be --$\tau_1$--

Col. 10, line 59, "$\tau 1$" should be --$\tau_1$--

Col. 11, line 36, delete "has"

Col. 11, line 60, "$\tau_1$" should be --"$t_1$"--

Col. 12, line 23, delete "case both" and substitute --the case where both--

Col. 12, line 30, "changer" should be --exchanger--

Col. 13, line 10, "case that" should be --that case,--

UNITED STATES PATENT AND TRADEMARK OFFICE
CERTIFICATE OF CORRECTION

PATENT NO. : 5,701,753

DATED : December 30, 1997

INVENTOR(S) : Kunio Iritani

It is certified that error appears in the above-identified patent and that said Letters Patent is hereby corrected as shown below:

Col. 14, line 66, after "$\Delta Tc$" insert --becomes--

Col. 15, line 57, "point D)" should be --point "D"--

Col. 16, line 20, "tos" should be --Tos--

Col. 16, line 28, "To7" should be --To'--

Col. 16, line 53, "(44) should be --(or 44)--

Col. 18, line 16, claim 3, "sucktion" should be --suction--

Col. 22, line 6, claim 19, before "18" insert --claim--

Col. 22, line 12, claim 20, before "18" insert --claim--

Signed and Sealed this

Seventh Day of July, 1998

*Attest:*

*Attesting Officer*

BRUCE LEHMAN

Commissioner of Patents and Trademarks